(12) United States Patent
Freer et al.

(10) Patent No.: US 10,240,271 B2
(45) Date of Patent: Mar. 26, 2019

(54) SEWING APPARATUS

(71) Applicant: Toyota Motor Engineering & Manufacturing North America, Inc., Erlanger, KY (US)

(72) Inventors: Paul L. Freer, Independence, KY (US); Thomas Martz, Winston-Salem, NC (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 274 days.

(21) Appl. No.: 15/063,861

(22) Filed: Mar. 8, 2016

(65) Prior Publication Data
US 2017/0260670 A1     Sep. 14, 2017

(51) Int. Cl.
*D05B 23/00*     (2006.01)
*B25J 11/00*     (2006.01)

(52) U.S. Cl.
CPC .............. *D05B 23/00* (2013.01); *B25J 11/00* (2013.01)

(58) Field of Classification Search
CPC ........ D05B 23/00; D05B 29/02; D05B 29/04; D05B 55/14
See application file for complete search history.

(56) References Cited

U.S. PATENT DOCUMENTS

| | | | | |
|---|---|---|---|---|
| 361,426 A | * | 4/1887 | Looker | D05B 73/00 112/258 |
| 1,160,986 A | * | 11/1915 | Kiewicz | F16H 7/14 112/217.1 |
| 3,563,196 A | * | 2/1971 | Nicolay | D05B 69/12 112/220 |
| 3,799,089 A | * | 3/1974 | Tolle | D05B 3/06 112/217.3 |
| 3,837,307 A | * | 9/1974 | Tolle | D05B 71/02 112/256 |

(Continued)

FOREIGN PATENT DOCUMENTS

| | | |
|---|---|---|
| CN | 101205662 | 4/2011 |
| WO | 9623626 | 8/1996 |

OTHER PUBLICATIONS

Basic 3D-Robot Sewing Unit KL 500; http://www.kslorsch.de/en/products/automotive/interior/basic-3d-robot-sewing-unit-kl-500; Access date Jun. 19, 2015, Source: KSL Keilmann Sondermaschinenbau GmbH.

*Primary Examiner* — Danny Worrell
(74) *Attorney, Agent, or Firm* — Dinsmore & Shohl LLP

(57) ABSTRACT

A sewing apparatus includes a housing, an arm shaft that extends through the housing in a longitudinal direction, a cam member coupled to the arm shaft, the cam member including a front face and a rear face positioned opposite the front face, where the cam member includes a lobe positioned on one of the front face and the rear face, a needle assembly coupled to the housing, the needle assembly including a needle shaft and a needle coupled to the needle shaft, and an arm pivotally coupled to the housing and engaged with the cam member, where the needle assembly is slidably engaged with the arm in a vertical direction and the needle assembly is constrained with respect to the arm in the longitudinal direction and a lateral direction that is transverse to the longitudinal direction.

12 Claims, 12 Drawing Sheets

(56) References Cited

U.S. PATENT DOCUMENTS

| | | | | |
|---|---|---|---|---|
| 4,553,489 A * | 11/1985 | Landwehr | ............... | D05B 21/00 112/220 |
| 4,691,651 A * | 9/1987 | Junemann | ............... | D05B 73/00 112/259 |
| 4,957,054 A * | 9/1990 | Sakuma | ................. | A41D 27/10 112/470.13 |
| 4,989,525 A * | 2/1991 | Portilla | ................. | B60R 21/235 112/10 |
| 5,095,834 A * | 3/1992 | Braun | .................... | D05B 19/00 112/221 |
| 5,313,897 A * | 5/1994 | Katamine | ............ | B25J 15/0019 112/470.13 |
| 5,313,987 A | 5/1994 | Rober et al. | | |
| 5,381,743 A | 1/1995 | Moll | | |
| 5,400,730 A * | 3/1995 | Moll | ...................... | D05B 59/04 112/168 |
| 5,875,726 A | 3/1999 | Keilmann | | |
| 5,988,085 A * | 11/1999 | Martz | .................... | D05B 39/00 112/470.13 |
| 6,129,031 A | 10/2000 | Sarh et al. | | |
| 6,164,224 A * | 12/2000 | Tachikawa | ............... | D05B 3/02 112/300 |
| 6,920,837 B2 | 7/2005 | Keilmann | | |
| 7,347,152 B1 * | 3/2008 | Wu | ........................ | D05B 15/00 112/259 |
| 7,363,869 B1 * | 4/2008 | Yang | ...................... | D05B 15/00 112/62 |
| 7,565,872 B2 | 7/2009 | Rippert et al. | | |
| 8,919,270 B2 | 12/2014 | Wenzel et al. | | |
| 9,610,131 B2 * | 4/2017 | Stoianovici | ............ | A61B 34/70 |
| 2002/0111634 A1 * | 8/2002 | Stoianovici | ............ | A61B 90/50 606/129 |

* cited by examiner

US 10,240,271 B2

SEWING APPARATUS

TECHNICAL FIELD

The present specification relates to sewing apparatuses, and in particular, to sewing apparatuses including a needle assembly that pivots with respect to a housing of the sewing apparatus. Methods for stitching a vehicle component with a sewing apparatus are also described.

BACKGROUND

Vehicles may include various components that include a decorative stitching, such as the seats, the door trim, and the instrument panel of the vehicle. The decorative stitching may be applied to the vehicle components using a sewing process. In a conventional sewing process, a sewing apparatus inserts a needle into the article that is being sewn. The needle is subsequently removed from the article being sewn, and the article is moved with respect to the sewing apparatus, and the needle may subsequently be inserted again into the article, repeating the process.

As a result of the curvature and relatively large size of some vehicle components, it may be difficult to move the article being sewn with respect to the sewing apparatus. Instead, the sewing apparatus may be moved with respect to the article being sewn. However, movement of the sewing apparatus with respect to the article being sewn can introduce lateral stress in the needle, in particular, when the needle is inserted into the article being sewn and the sewing apparatus is moved in a direction that is transverse to the needle. Stress in the needle may lead to fracture, which may damage the article being sewn and may require replacement of the needle, leading to manufacturing losses and increased production costs. Accordingly, a need exists for alternative sewing apparatuses.

SUMMARY

In one embodiment, a sewing apparatus includes a housing, an arm shaft that extends through the housing in a longitudinal direction, a cam member coupled to the arm shaft, the cam member including a front face and a rear face positioned opposite the front face, where the cam member includes a lobe positioned on one of the front face and the rear face, a needle assembly coupled to the housing, the needle assembly including a needle shaft and a needle coupled to the needle shaft, and an arm pivotally coupled to the housing and engaged with the cam member, where the needle assembly is slidably engaged with the arm in a vertical direction and the needle assembly is constrained with respect to the arm in the longitudinal direction and a lateral direction that is transverse to the longitudinal direction.

In another embodiment, a method of stitching a vehicle component includes positioning a sewing apparatus over at least a portion of the vehicle component, the sewing apparatus including a housing, an arm pivotally coupled to the housing, and a needle assembly coupled to the arm, moving the needle assembly toward the vehicle component in a vertical direction, inserting at least a portion of the needle assembly into the vehicle component, moving the sewing apparatus in a stitch direction, and pivoting the arm with respect to the housing, thereby moving the needle assembly in a direction that is opposite of the stitch direction.

In yet another embodiment, a robot sewing apparatus includes a base, a robot arm coupled to the base, a sewing apparatus coupled to the robot arm, the sewing apparatus including a housing, an arm shaft that extends through the housing in a longitudinal direction, a cam member coupled to the arm shaft, the cam member including a front face and a rear face positioned opposite the front face, where the cam member includes a lobe positioned on one of the front face and the rear face, a needle assembly coupled to the housing, the needle assembly including a needle shaft and a needle coupled to the needle shaft, and an arm pivotally coupled to the housing and engaged with the cam member, where the needle assembly is constrained with respect to the arm in a stitch direction and the needle assembly is slidably engaged with the arm in a vertical direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Sewing apparatuses according to the present disclosure include a needle assembly that is pivotally coupled to a housing of the sewing apparatus. As the sewing apparatus moves in a stitch direction, such as when the sewing apparatus is coupled to a robot arm that moves the sewing apparatus in the stitch direction, the needle assembly may pivot with respect to the housing of the sewing apparatus, moving the needle assembly in a direction that is opposite of the stitch direction. By moving the needle assembly in a direction that is opposite of the stitch direction, shear stress on the needle assembly, such as may result from movement of the needle assembly in the stitch direction with respect to the article being sewn, may be reduced or effectively eliminated. These and other embodiments will be described in more detail below in reference to the appended drawings.

As used herein, the term "longitudinal direction" refers to the forward-rearward direction of the sewing apparatus (i.e., in the +/−X-direction as depicted). The term "lateral direction" refers to the cross-wise direction of the sewing apparatus (i.e., in the +/−Y-direction as depicted), and is transverse to the longitudinal direction. The term "vertical direction" refers to the upward-downward direction of the sewing apparatus (i.e., in the +/−Z-direction as depicted).

Figure 1:
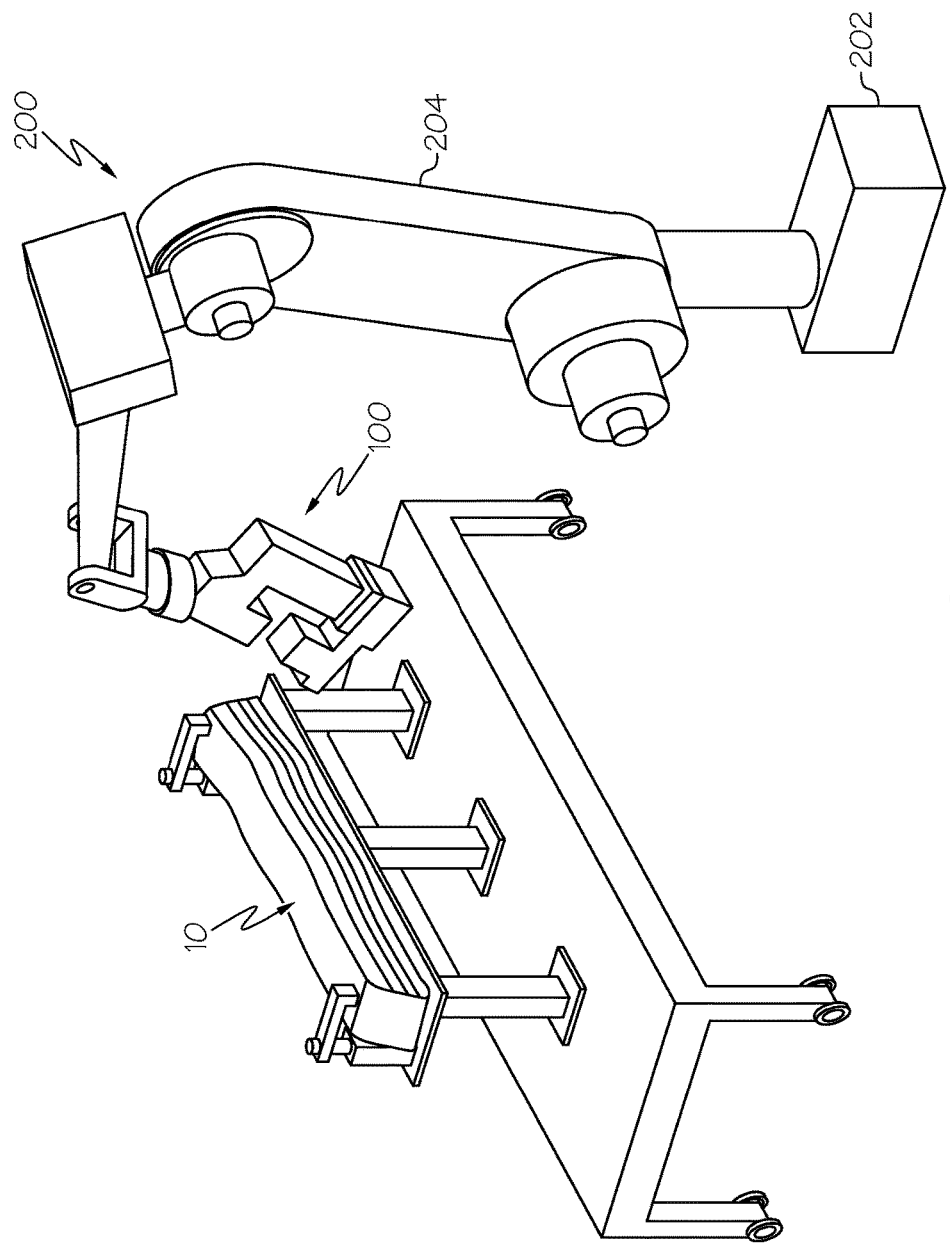
FIG. 1 schematically depicts a sewing apparatus and a vehicle component according to one or more embodiments shown and described herein.

Referring initially to FIG. 1, a robot sewing apparatus 200 is schematically depicted. The robot sewing apparatus 200 includes a base 202 coupled to a robot arm 204, and a sewing apparatus 100 coupled to the robot arm 204. The robot arm 204 and the base 202 may include an industrial multi-axis robot that manipulates the position of the sewing apparatus 100. The sewing apparatus 100 may be positioned over at least a portion of a vehicle component 10, such that the sewing apparatus 100 may apply a stitch to the vehicle component 10. In the embodiment depicted in FIG. 1, the vehicle component 10 is depicted as an instrument panel, but may alternatively include other vehicle components, such as a seat, door trim, or the like.

Figure 2:
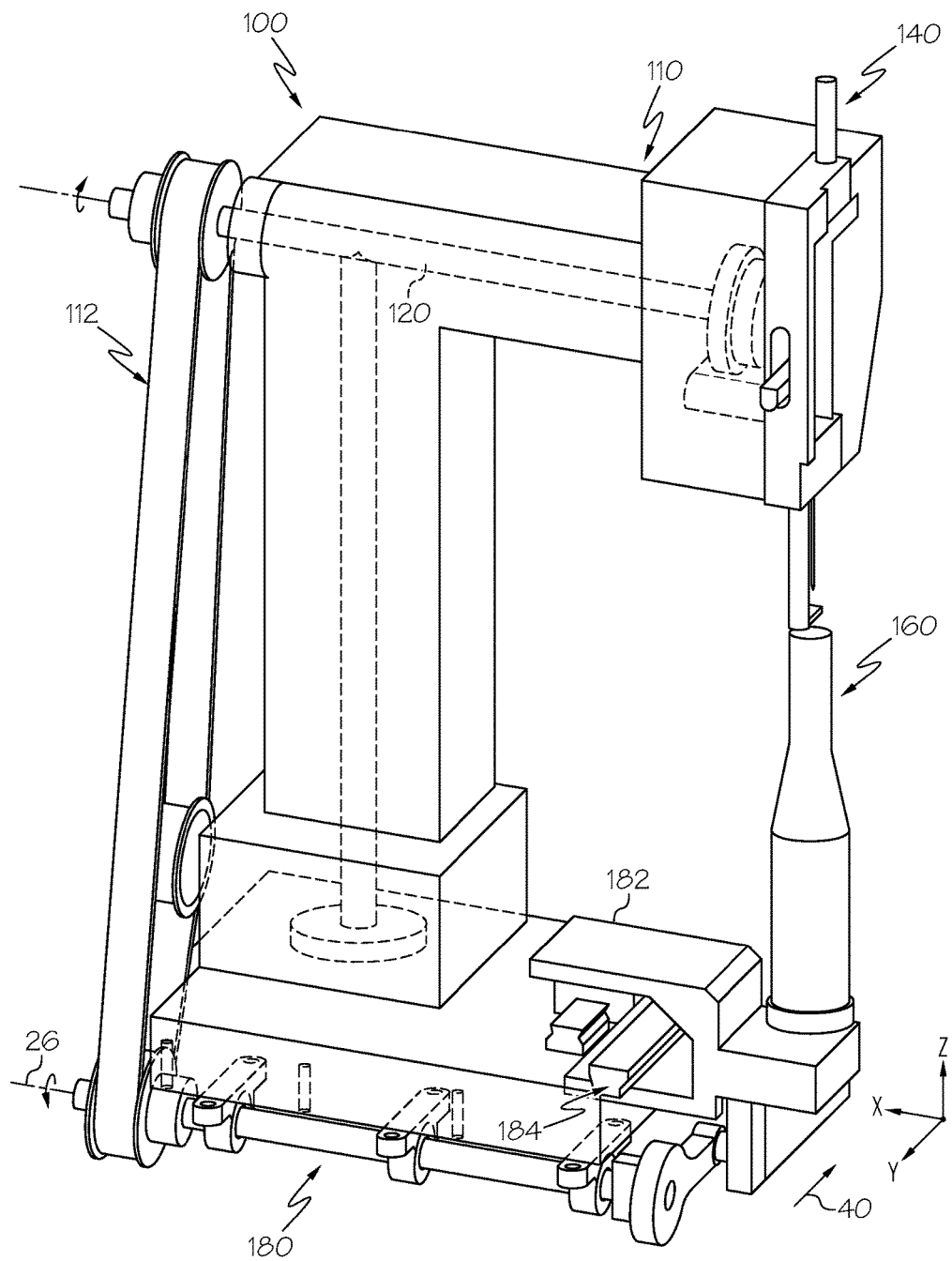
FIG. 2 schematically depicts a perspective view of the sewing apparatus of FIG. 1 according to one or more embodiments shown and described herein.

Referring to FIG. 2, a perspective view of the sewing apparatus 100 is depicted in isolation. The sewing apparatus 100 includes a housing 110, a needle assembly 140, and a hook assembly 160 positioned below the needle assembly 140 in the vertical direction. The needle assembly 140 and the hook assembly 160 operate to apply stitching to an article, such as the vehicle component 10 shown in FIG. 1.

The hook assembly 160 is slidably coupled to the housing 110, such that the hook assembly 160 may move with respect to the housing 110 in the lateral direction. The hook assembly 160 may be coupled to a plate 182, which is coupled to a slide 184 of the housing 110. The plate 182 is also coupled to an eccentric crank 180. The eccentric crank 180 rotates about a crank axis 26, which extends in the longitudinal direction, and the eccentric crank 180 converts rotational movement about the crank axis 26 into oscillating linear movement in the lateral direction. As the hook assembly 160 is coupled to the eccentric crank 180 through the plate 182, the linear movement of the eccentric crank 180 in the lateral direction causes the hook assembly 160 to oscillate in the lateral direction. In some embodiments, the oscillating motion of the hook assembly 160 in the lateral direction may be tuned in terms of distance travelled in the lateral direction as well as in timing to match motion of the needle assembly 140 in the lateral direction. By oscillating in the lateral direction, the hook assembly 160 may remain aligned with the needle assembly 140 to form a stitch as the sewing apparatus 100 moves in a stitch direction 40, as will be described in greater detail herein.

In embodiments, a belt 112 is engaged with and may drive the eccentric crank 180 to rotate about the crank axis 26. Alternatively rotation of the eccentric crank 180 may be driven by a chain or the like. The belt 112 may be driven by a motor, such as a motor of the robot arm 204 (FIG. 1).

Figure 3:
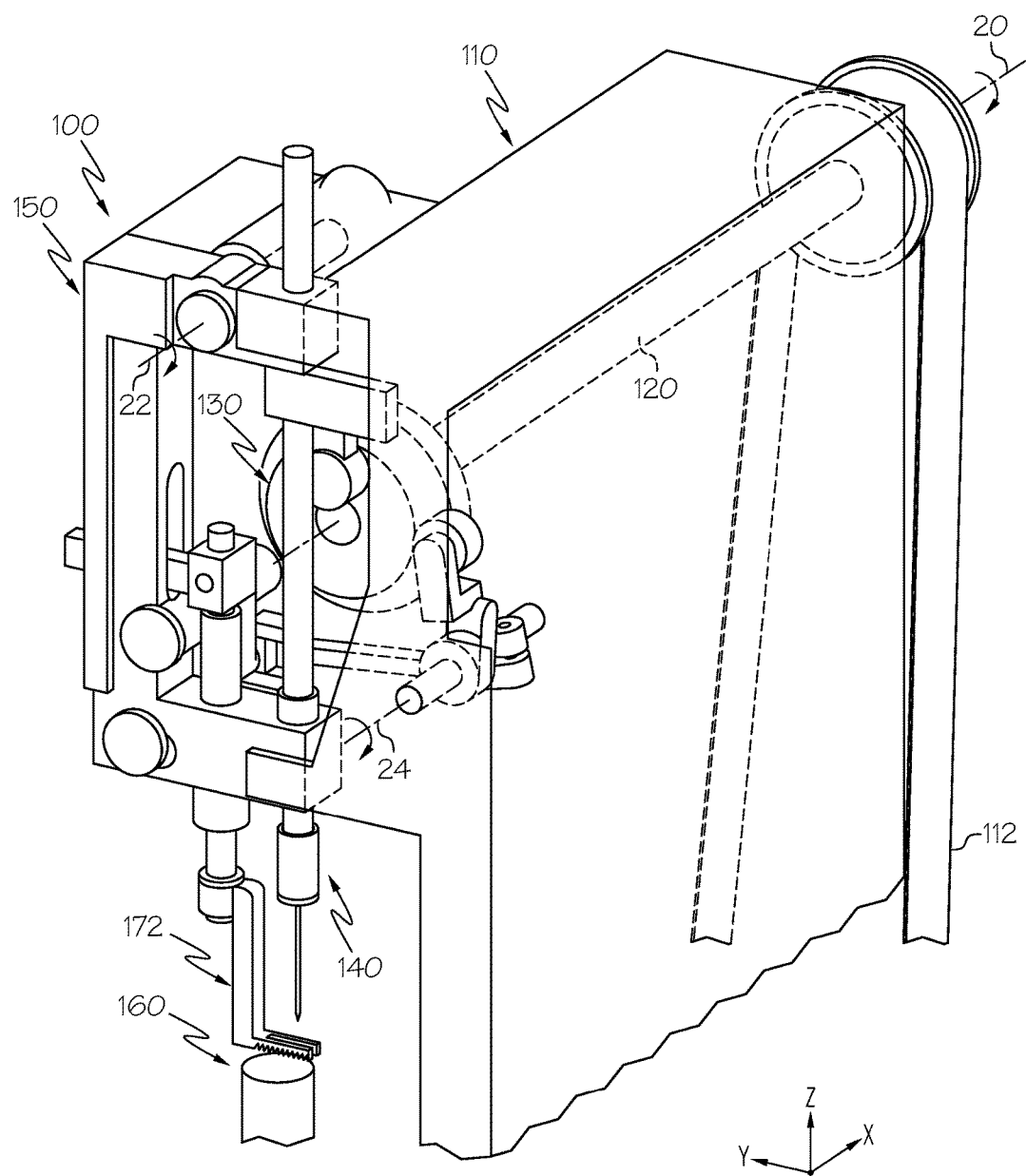
FIG. 3 schematically depicts an enlarged perspective view of the sewing apparatus of FIG. 1 according to one or more embodiments shown and described herein.

Referring to FIG. 3, an enlarged perspective view of a front portion of the sewing apparatus 100 is depicted. The sewing apparatus 100 includes an arm shaft 120 that extends in the longitudinal direction and that rotates about a cam axis 20. Rotation of the arm shaft 120 may be driven by the belt 112, which is engaged with the arm shaft 120. Alternatively, rotation of the arm shaft 120 may be driven by a chain that is engaged with the arm shaft 120. The belt 112 may be driven by a motor, such as a motor of the robot arm 204 (FIG. 1). In embodiments, the belt 112 may simultaneously drive the arm shaft 120 and the eccentric crank 180 (FIG. 2). Alternatively, the arm shaft 120 and the eccentric crank 180 (FIG. 2) may be driven by separate belts or chains.

The sewing apparatus 100 includes a cam member 130 that is coupled to the arm shaft 120, such that the cam member 130 rotates with the cam member 130 about the cam axis 20. Rotation of the cam member 130 drives motion of the needle assembly 140, as will be described in greater detail herein.

Figure 4:
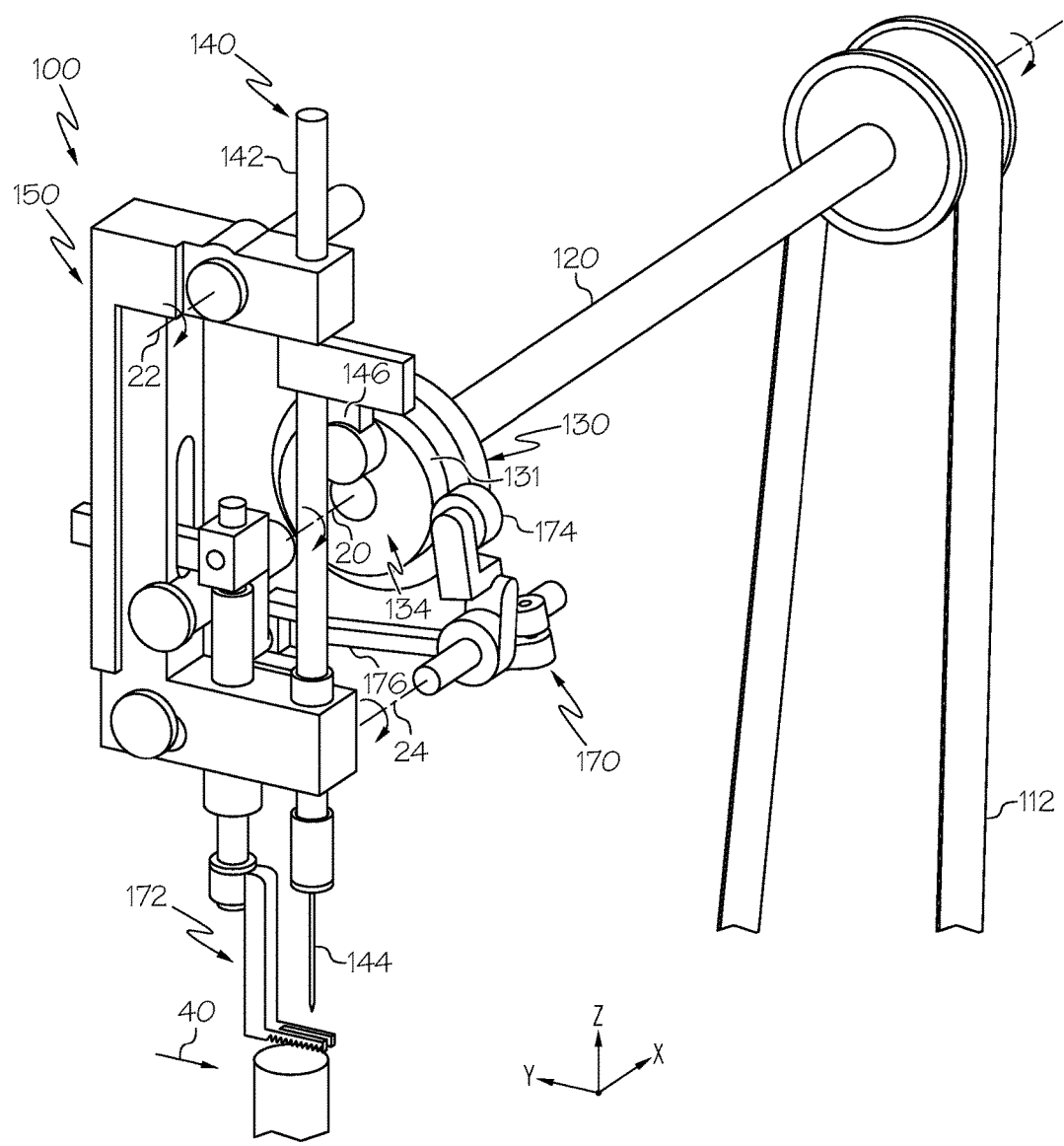
FIG. 4 schematically depicts a needle assembly, a cam member, and an arm of the sewing apparatus of FIG. 1 shown in isolation according to one or more embodiments shown and described herein.

Referring to FIG. 4, an enlarged perspective view of the needle assembly 140 and the arm shaft 120 is depicted with the housing 110 (FIG. 3) removed for clarity. The needle assembly 140 extends in the vertical direction and includes a needle shaft 142 and a needle 144 coupled to the needle shaft 142. The needle assembly 140 is coupled to the cam member 130 by a cam link 146, which is pivotally coupled to the needle shaft 142 and the cam member 130. When the cam member 130 rotates about the cam axis 20, the cam link 146 converts the rotational motion of the cam member 130 into linear motion, moving the needle assembly 140 up and down in the vertical direction. In particular, as the cam member 130 rotates about the cam axis 20, the needle assembly 140 oscillates in the vertical direction. By driving the needle assembly 140 up and down in the vertical direction, the needle 144 may be inserted and withdrawn from the vehicle component 10 (FIG. 1) to form a stitch.

Figure 5:
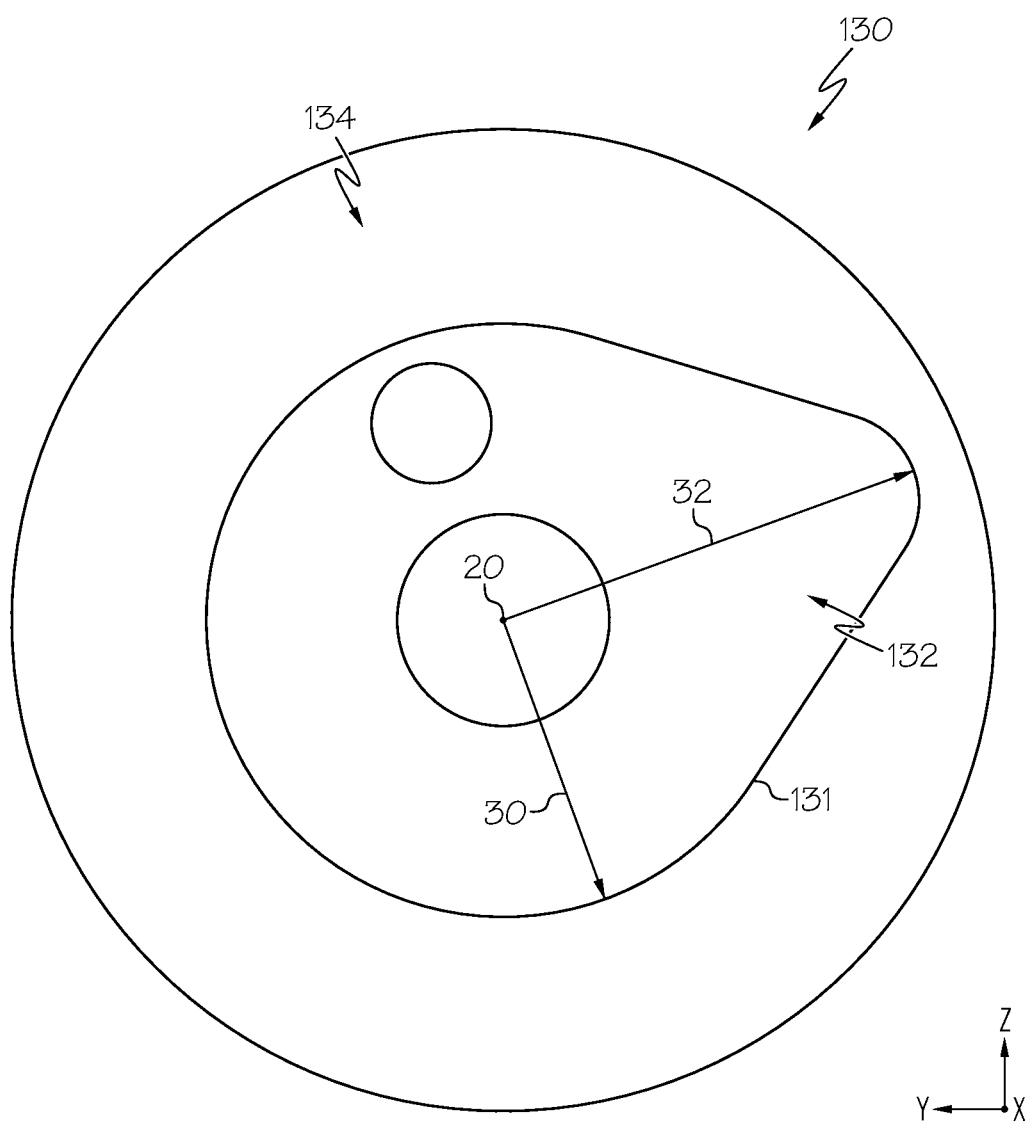
FIG. 5 schematically depicts a front face of the cam member of FIG. 4 shown in isolation according to one or more embodiments shown and described herein.

Referring collectively to FIGS. 4 and 5, the cam member 130 includes a front lobe 132 positioned on a front face 134 of the cam member 130. In embodiments, the cam member 130 is positioned rearward of the needle assembly 140 in the longitudinal direction, and the front face 134 of the cam member 130 is oriented to face forward in the longitudinal direction, such that the front face 134 is oriented to face the needle assembly 140.

The cam member 130 includes a front engagement surface 131 that extends outward from the cam member 130 in the longitudinal direction. The front engagement surface 131 includes a non-circular shape around the cam axis 20, and the front engagement surface 131 extends outward from the cam axis 20 farther at the front lobe 132 than at positions outside of the front lobe 132. In particular, the cam member 130 includes a lobe radius 32 evaluated between the cam axis 20 and the front engagement surface 131 at the front lobe 132, and the cam member 130 includes a nominal radius 30 evaluated between the cam axis 20 and the front engagement surface 131 at positions outside of the front lobe 132, where the lobe radius 32 is greater than the nominal radius 30.

Figure 6A:
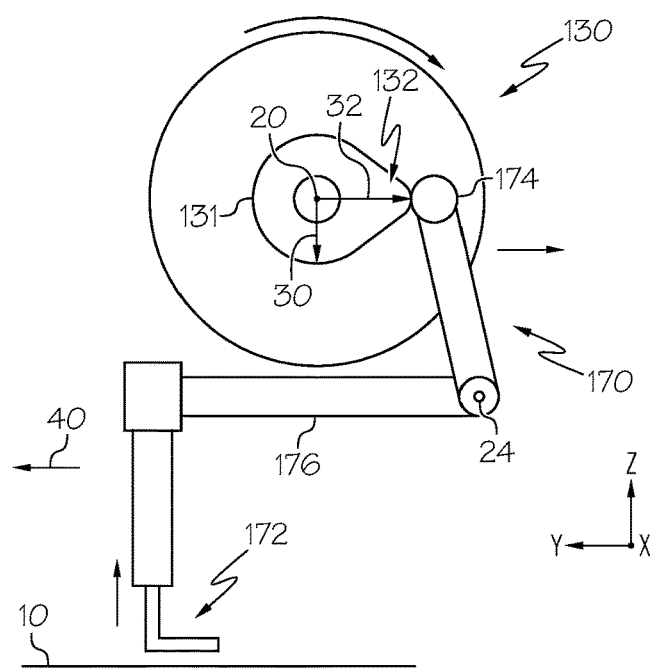
FIG. 6A schematically depicts a front lobe of the cam member of FIG. 4 engaging a follower member according to one or more embodiments shown and described herein.
Figure 6B:
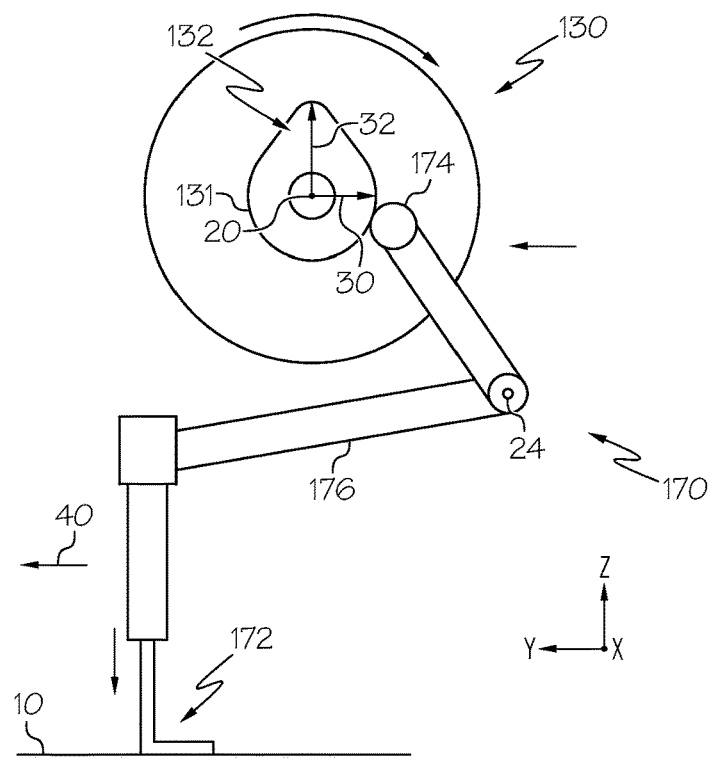
FIG. 6B schematically depicts the front lobe disengaged from the follower member of 6A according to one or more embodiments shown and described herein.

Referring to FIGS. 4, 6A, and 6B, the sewing apparatus 100 includes a follower member 170 that is engaged with the front engagement surface 131 of the cam member 130, and the follower member 170 repositions a foot 172 between a raised position and a lowered position that is spaced apart from the raised position in the vertical direction. The follower member 170 is coupled to the foot 172 of the sewing apparatus 100, and the foot 172 may assist in guiding and engaging articles sewn using the sewing apparatus 100, such as the vehicle component 10 (FIG. 1). The follower member 170 is pivotally coupled to the housing 110 (FIG. 3), such that the follower member 170 may pivot about a follower axis 24.

The follower member 170 includes a roller 174 that is engaged with the front engagement surface 131. The roller 174 may be rotatably engaged with the front engagement surface 131, such that front engagement surface 131 moves with respect to the roller 174 when the cam member 130 rotates about the cam axis 20. The roller 174 is coupled to a follower arm 176 that extends between the roller 174 and the foot 172, such that the foot 172 is engaged with the cam member 130 through the follower member 170. The follower arm 176 is pivotally coupled to the housing 110 (FIG. 3) at the follower axis 24.

Referring to FIG. 6A, as the cam member 130 rotates about the cam axis 20, the front lobe 132 engages the follower member 170, and in particular, the roller 174 of the follower member 170. Since the front lobe 132 includes the lobe radius 32 that is larger than the nominal radius 30, the front lobe 132 moves the roller 174 of the follower member 170 away from the cam axis 20 when the follower member 170 engages the front lobe 132. As the roller 174 moves away from the cam axis 20, the follower arm 176 may pivot about the follower axis 24 with respect to the housing 110 (FIG. 3). As the follower arm 176 pivots about the follower axis 24, the follower member 170 moves the foot 172 upward in the vertical direction with respect to the housing 110 (FIG. 3), positioning the foot 172 in the raised position.

Referring to FIG. 6B, as the cam member 130 continues to rotate about the cam axis 20, the roller 174 may disengage from the front lobe 132, and may engage portions of the front engagement surface 131 including the nominal radius 30. Alternatively, the roller 174 may disengage the front engagement surface 131 when the roller 174 disengages from the front lobe 132 such that the roller 174 is spaced apart from the front engagement surface 131. As the roller 174 disengages the front lobe 132, the roller 174 may move toward the cam axis 20 and may remain closer to the cam axis 20 than when the roller 174 is engaged with the front lobe 132. When the roller 174 moves toward the cam axis 20, the follower arm 176 pivots about the follower axis 24, moving the foot 172 downward in the vertical direction with respect to the housing 110 (FIG. 3), positioning the foot 172 in the lowered position. The follower arm 176 may pivot about the follower axis 24 when the roller 174 disengages from the front lobe 132 as a result of the weight of the foot 172 and the follower arm 176. Alternatively, a biasing member, such as a torsion spring, a compression spring, a tension spring, or the like, may bias the follower arm 176 to pivot about the follower axis 24 into the position shown in FIG. 6B.

Accordingly, through engagement and disengagement with the front lobe 132, the follower member 170 moves the foot 172 upward and downward in the vertical direction. By moving the foot 172 upward and downward in the vertical direction, the foot 172 may engage and disengage articles to be sewn, such as the vehicle component 10.

Figure 7:
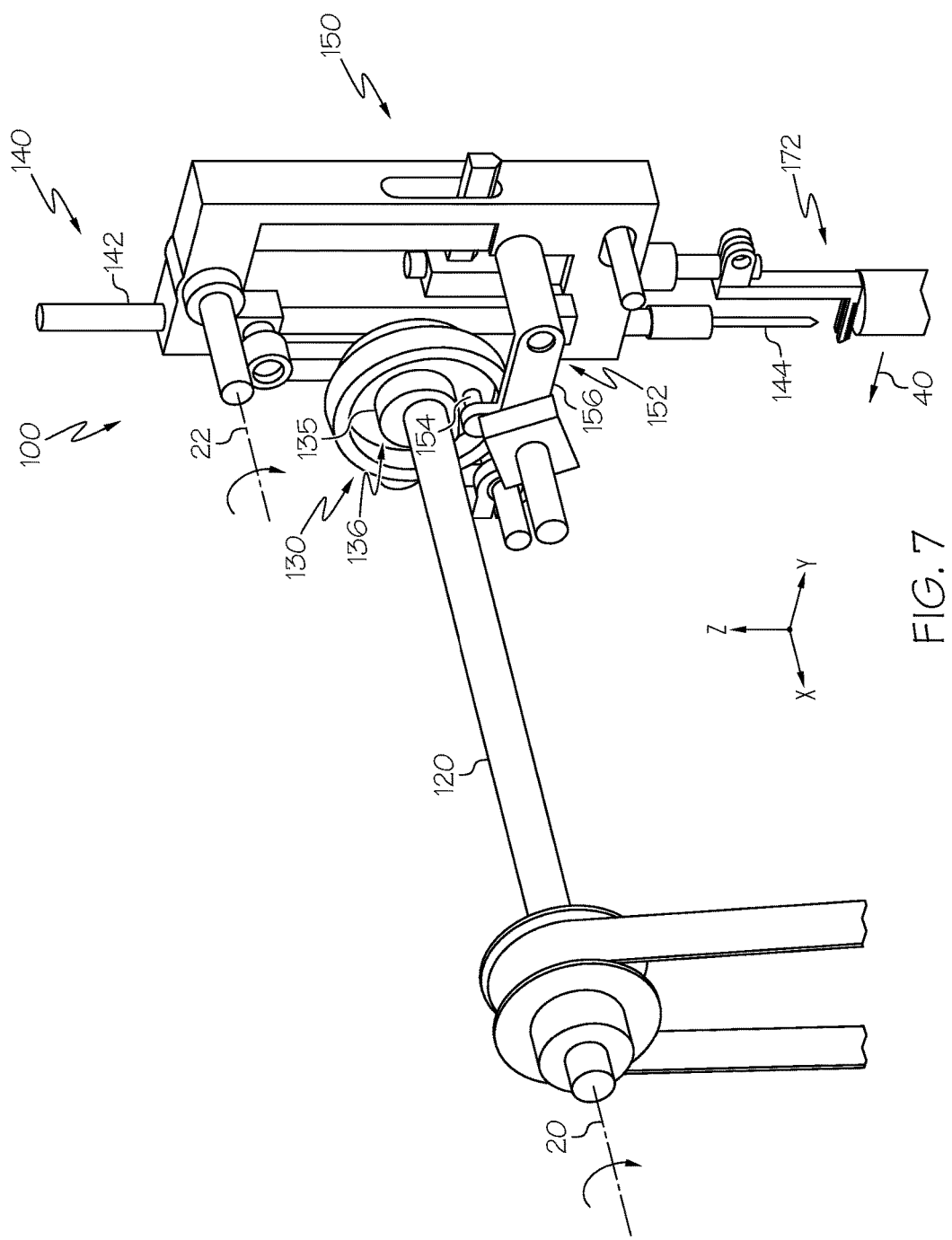
FIG. 7 schematically depicts a rear perspective view of the needle assembly, the cam member, and the arm of FIG. 4 shown in isolation according to one or more embodiments shown and described herein.

Referring to FIG. 7, a rear perspective view of the sewing apparatus 100 is depicted with the housing 110 (FIG. 3) removed for clarity. The sewing apparatus 100 includes an arm 150 that is pivotally coupled to the housing 110 (FIG. 3) of the sewing apparatus 100. The foot 172 and the needle assembly 140 are coupled to the arm 150, and the foot 172 and the needle assembly 140 are coupled to the housing 110 (FIG. 3) through the arm 150. The needle assembly 140 and the foot 172 may be slidably engaged with the arm 150 in the vertical direction, such that the foot 172 and the needle assembly 140 may move with respect to the arm 150 in the vertical direction. The foot 172 and the needle assembly 140 are coupled to the arm 150 such that the foot 172 and the needle assembly 140 are constrained with respect to the arm 150 in the lateral direction and the longitudinal direction. In operation, the sewing apparatus 100 may move in a stitch direction 40 that extends in the lateral direction, and, as the needle assembly 140 and the foot 172 are constrained with respect to the arm 150 in the lateral direction, the needle assembly 140 and the foot 172 are constrained with respect to the arm 150 in the stitch direction 40.

In embodiments, the arm 150 is pivotally coupled to the housing 110 (FIG. 3) such that the arm 150 pivots about an arm pivot axis 22 that extends in the longitudinal direction. As the foot 172 and the needle assembly 140 are constrained with respect to the arm 150 in the longitudinal and the lateral directions, when the arm 150 pivots about the arm pivot axis 22, the needle assembly 140 and the foot 172 pivot about the arm pivot axis 22 with the arm 150.

Figure 8:
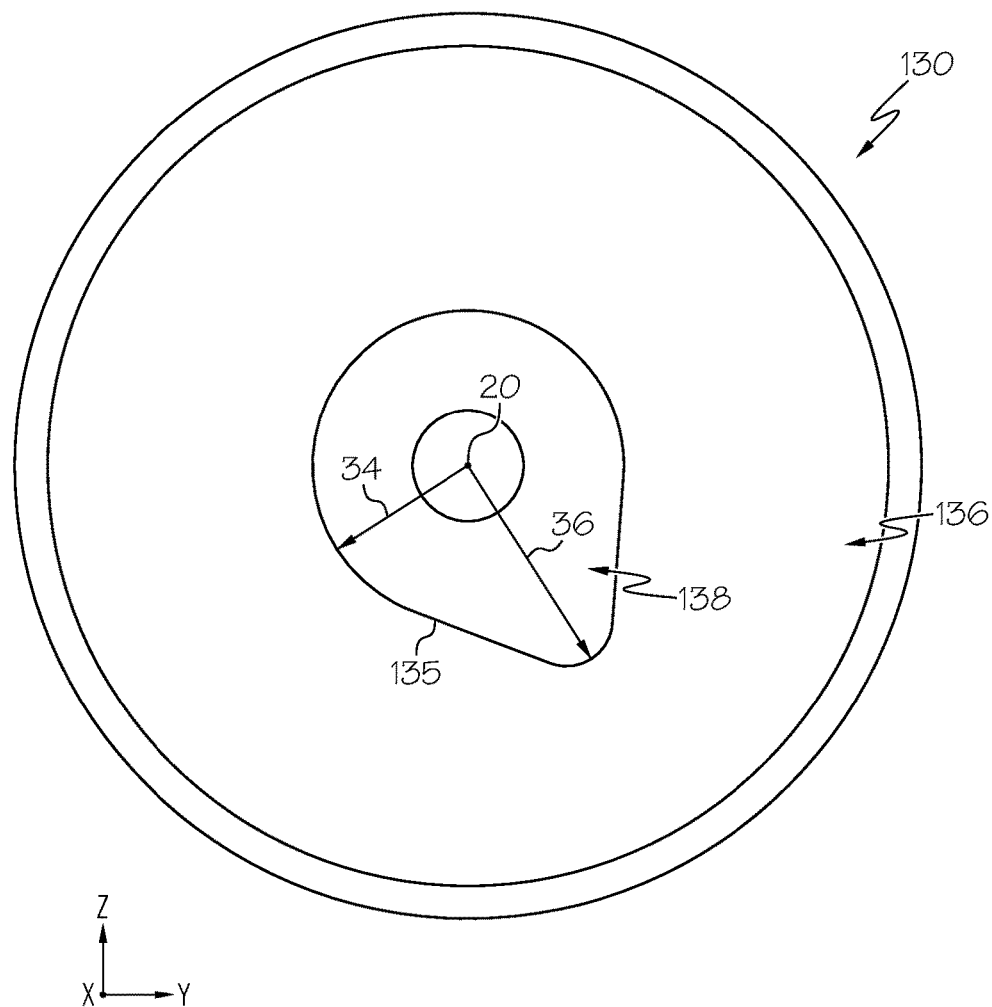
FIG. 8 schematically depicts a rear face of the cam member of FIG. 4 shown in isolation according to one or more embodiments shown and described herein.

Referring to FIGS. 7 and 8 collectively, the cam member 130 includes a rear lobe 138 positioned on a rear face 136 of the cam member 130 opposite the front face 134 (FIG. 5) in the longitudinal direction. The rear face 136 of the cam member 130 includes a rear engagement surface 135 that extends outward from the cam member 130 in the longitudinal direction. The rear engagement surface 135 includes a non-circular shape around the cam axis 20, and the rear engagement surface 135 extends outward from the cam axis 20 farther at the rear lobe 138 than at positions outside of the rear lobe 138. In particular, the cam member 130 includes a rear lobe radius 36 evaluated between the cam axis 20 and the rear engagement surface 135 at a rear lobe 138, and the cam member 130 includes a nominal radius 34 evaluated between the cam axis 20 and the rear engagement surface 135 at positions outside of the rear lobe 138, where the rear lobe radius 36 is greater than the nominal radius 34.

Figure 9A:
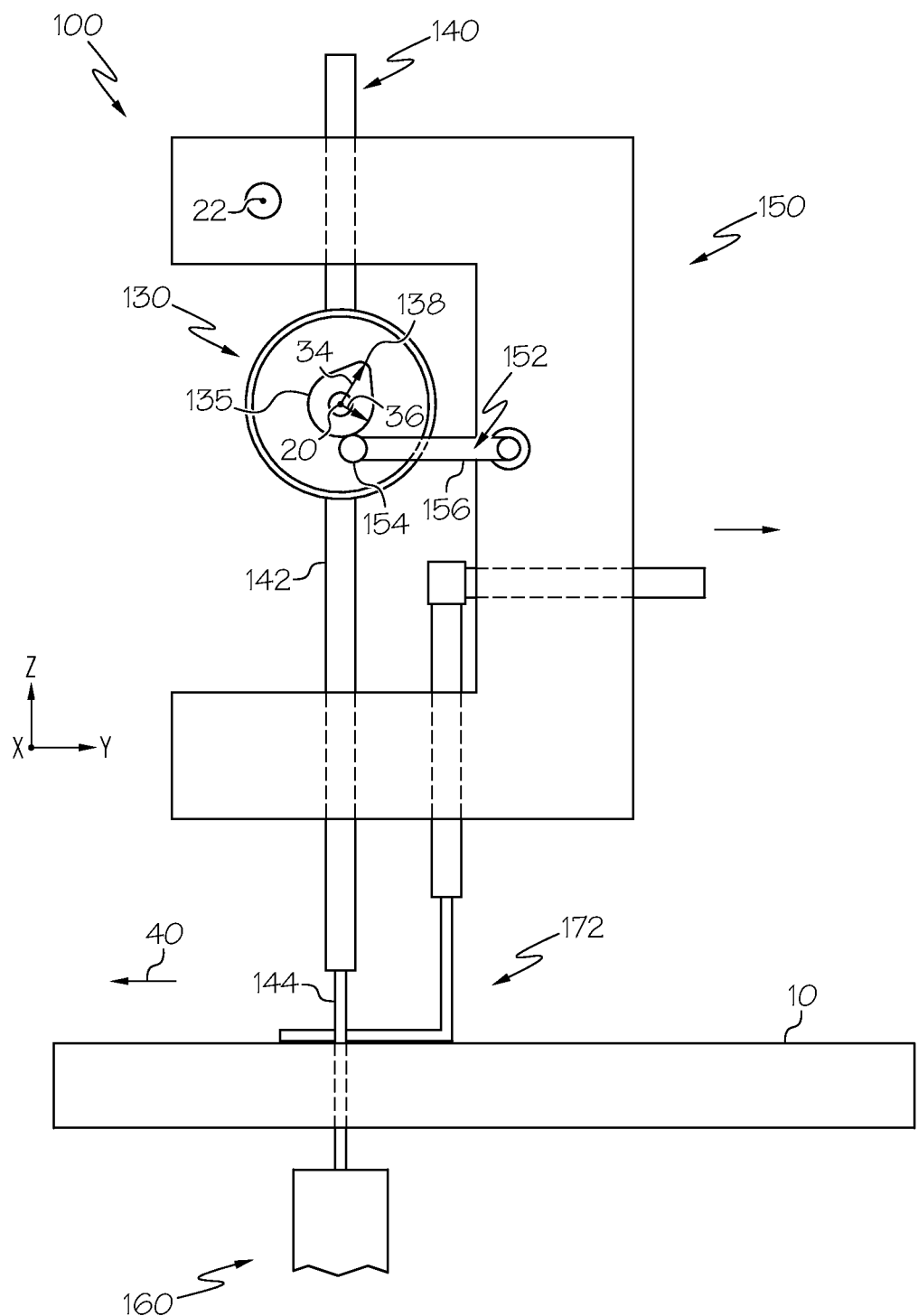
FIG. 9A schematically depicts a rear view of a rear lobe of the cam member disengaged from the arm of FIG. 7 according to one or more embodiments shown and described herein.
Figure 9B:
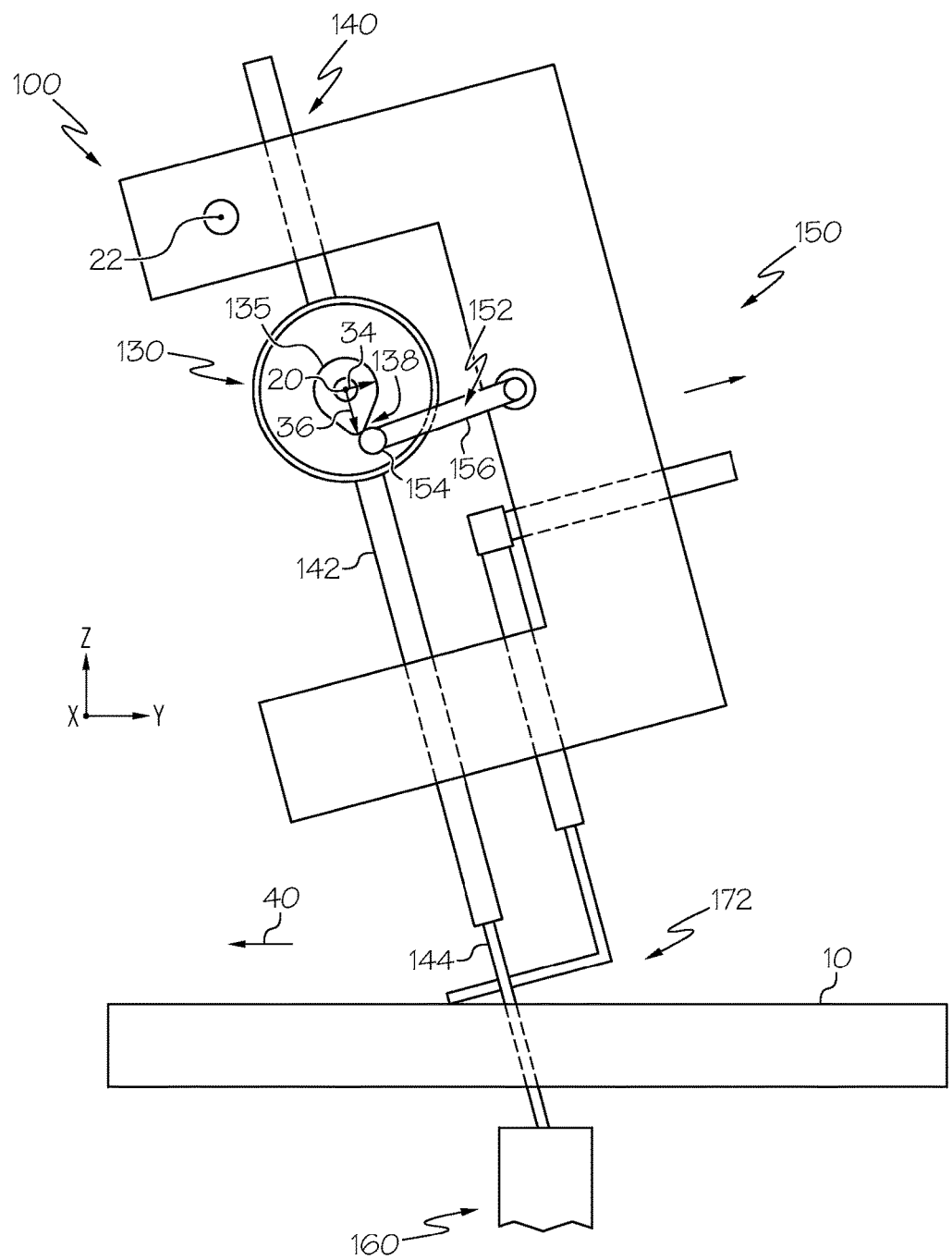
FIG. 9B schematically depicts a rear view of the rear lobe of the cam member engaged with the arm of FIG. 9A according to one or more embodiments shown and described herein.

Referring to FIGS. 7, 9A, and 9B, the arm 150 may engage the rear engagement surface 135 of the cam member 130, repositioning the arm 150, the needle assembly 140, and the foot 172 between a first position and a second position. In embodiments, a linking member 152 is coupled to the arm 150 and is engaged with the rear engagement surface 135 of the cam member 130, such that the arm 150 is engaged with the rear engagement surface 135 through the linking member 152. The linking member 152 may include a linking arm 156 that is coupled to the arm 150, and the linking member 152 may include a follower portion 154 that is engaged with the rear engagement surface 135. The follower portion 154 may include a roller, or the like, that engages with the rear lobe 138 to pivot the arm 150 about the arm pivot axis 22, as will be described in greater detail herein. In embodiments, the follower portion 154 may be rotatably engaged with the rear engagement surface 135, such that the rear engagement surface 135 moves with respect to the follower portion 155 as the cam member 130 rotates about the cam axis 20.

Referring to FIG. 9B, as the cam member 130 rotates about the cam axis 20, the rear lobe 138 engages the arm 150. In particular, the rear lobe 138 engages the arm 150 through the follower portion 154 and the linking member 152. Since the cam member 130 includes the rear lobe radius 36 at the rear lobe 138 that is larger than the nominal radius 34, the rear lobe 138 moves the arm 150 away from the cam axis 20 when the arm 150 engages the rear lobe 138. As the arm 150 moves away from the cam axis 20, contact between the follower portion 154 and the rear lobe 138 causes the arm 150 to pivot about the arm pivot axis 22. As the arm 150 pivots about arm pivot axis 22, the arm 150 moves the needle assembly 140 and the foot 172 in the lateral direction. In the embodiment depicted in FIG. 9B, as the arm 150 pivots about the arm pivot axis 22, the arm 150 and moves the needle assembly 140 and the foot 172 in a direction opposite the stitch direction 40.

Referring to FIG. 9A, as the cam member 130 continues to rotate about the cam axis 20, the arm 150 may disengage from the rear lobe 138, and the follower portion 154 may engage portions of the rear engagement surface 135 including the nominal radius 34. Alternatively, the follower portion 154 may disengage from the rear engagement surface 135 such that the rear engagement surface 135 is spaced apart from the follower portion 154. As the arm 150 disengages the rear lobe 138, the arm 150 may move toward the cam axis 20 and may remain closer to the cam axis 20 than when the arm 150 is engaged with the rear lobe 138. When the arm 150 moves toward the cam axis 20, the arm 150 pivots about the arm pivot axis 22, moving the needle assembly 140 and the foot 172 in the lateral direction. The arm 150 may pivot about the arm pivot axis 22 when the follower portion 154 disengages from the rear lobe 138 as a result of the weight of the arm 150, the needle assembly 140, and the foot 172. Alternatively, a biasing member, such as a torsion spring, a compression spring, a tension spring, or the like, may bias the arm 150 to pivot about the arm pivot axis 22 into the position shown in FIG. 9A.

Accordingly, through engagement and disengagement with the rear lobe 138, the arm 150 moves the needle assembly 140 and the foot 172 in the lateral direction. By moving the needle assembly 140 and the foot 172 in the lateral direction, the arm 150 may move the needle assembly 140 and the foot 172 a direction opposite the stitch direction 40, which may reduce shear stress on the needle 144 when the sewing apparatus 100 moves in the stitch direction 40.

Figure 10:
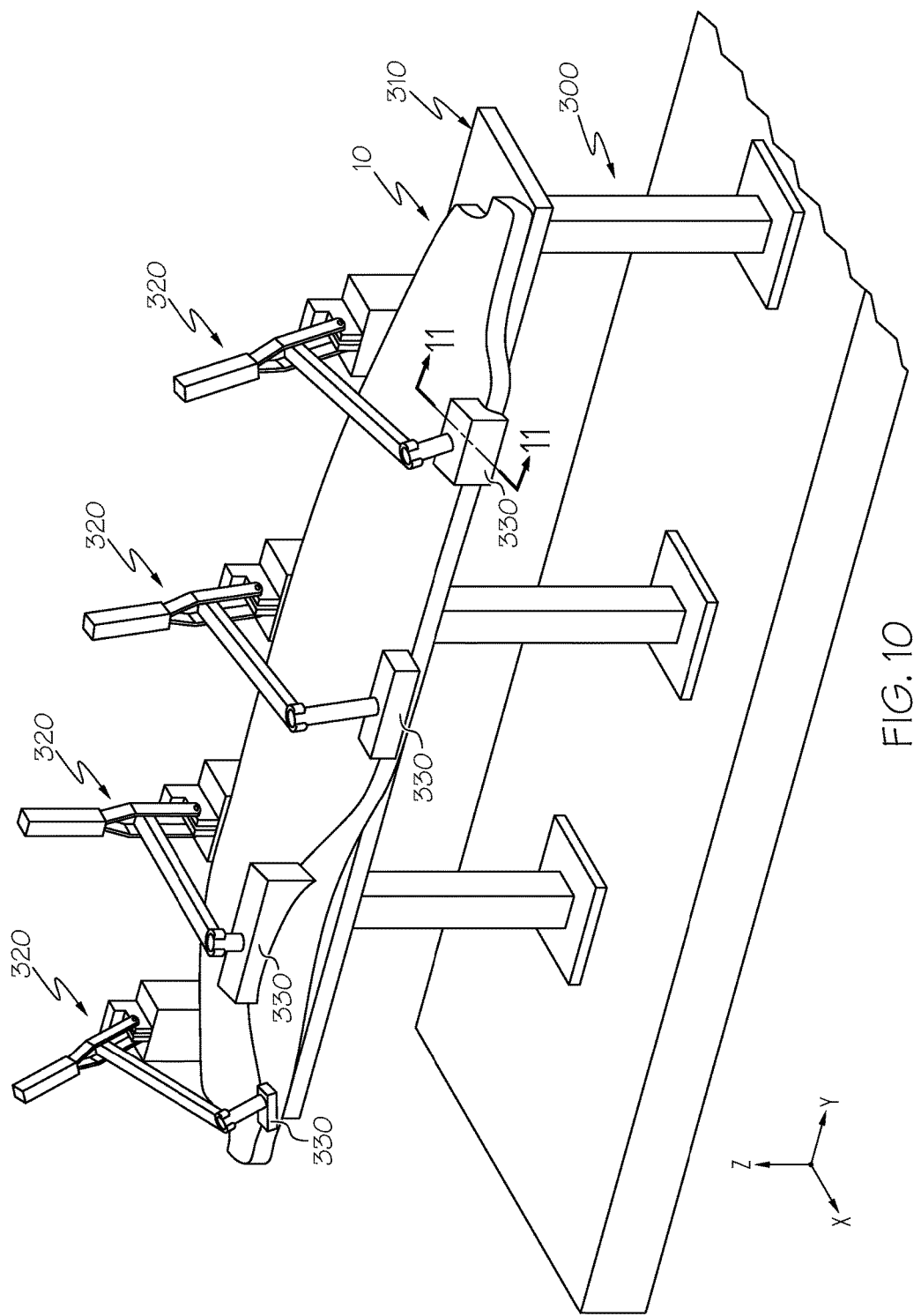
FIG. 10 schematically depicts a perspective view of the vehicle component of FIG. 1 on a support deck according to one or more embodiments shown and described herein.

Referring to FIG. 10, a perspective view of the vehicle component 10 on a support deck 300 is depicted. The support deck 300 may support and position the vehicle component 10 with respect to the robot sewing apparatus 200 (FIG. 1) such that the sewing apparatus 100 (FIG. 2) may apply a stitching. The support deck 300 includes one or more clamps 320 which assist in positioning the vehicle component 10 as desired on the support deck 300.

Figure 11:
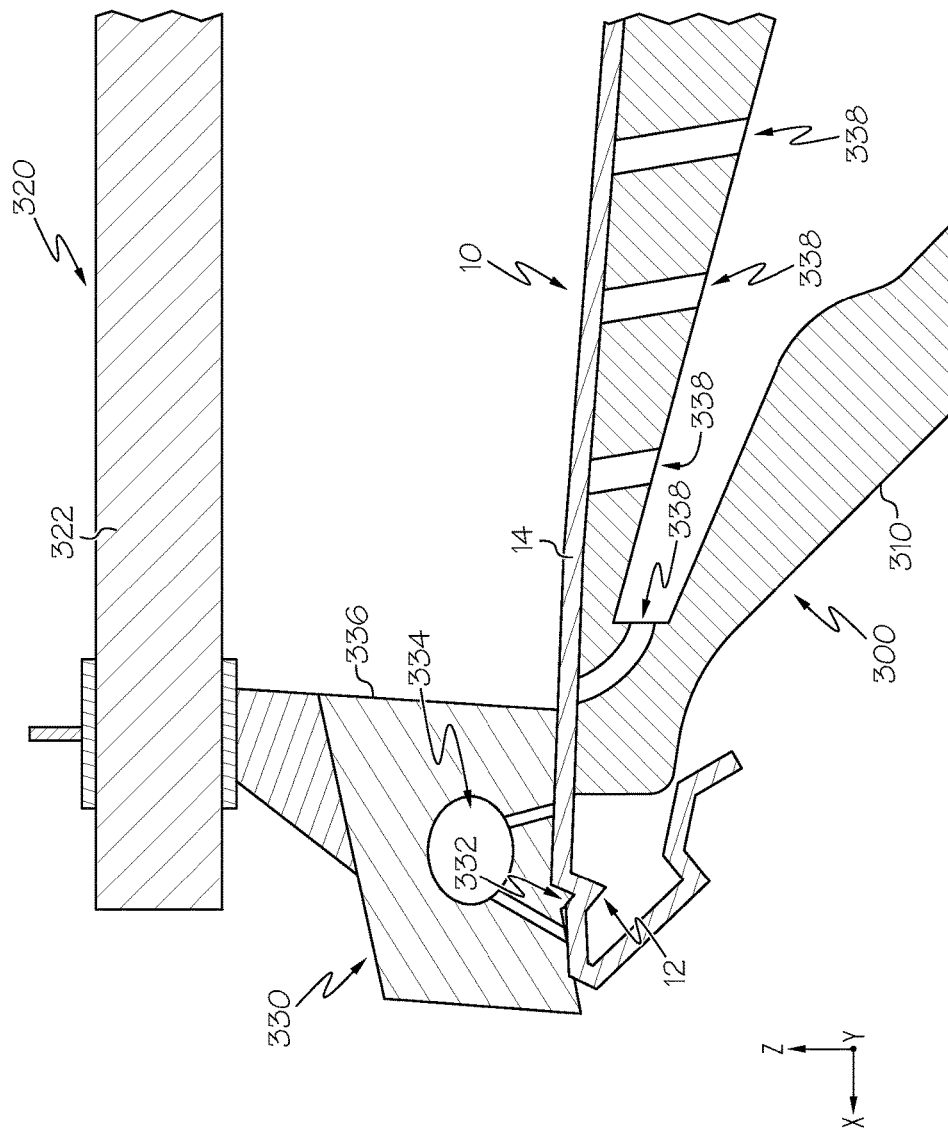
FIG. 11 schematically depicts a section view of the vehicle component and support deck along section 11-11 of FIG. 10 according to one or more embodiments shown and described herein.

Referring to FIG. 11, a section view of one of the clamps 320 along section 11-11 of FIG. 10 is schematically depicted. The support deck 300 includes a support nest 310, on which the vehicle component 10 is positioned. In some embodiments, the support nest 310 may define one or more vacuum passages 338 that may draw the vehicle component 10 against the support nest 310 and may retain the position of the vehicle component 10 with respect to the support nest 310. A low vacuum (i.e., a pressure that is less than an ambient pressure around the support nest 310) may be applied to the one or more vacuum passages 338, and may act to draw the vehicle component 10 against the support nest 310. The low vacuum may be applied to the one or more vacuum passages 334 by an air pump or the like.

The clamp 320 includes a clamp arm 322 and a clamp block 330 coupled to the clamp arm 322. The clamp 320 is repositionable between a clamped position, in which the clamp block 330 engages the vehicle component 10 and presses the vehicle component 10 against the support nest 310, as shown in FIG. 11, and an unclamped position, in which the clamp block 330 is spaced apart from the vehicle component 10. The clamp 320 may be rigidly coupled to the support deck 300, such that when the clamp 320 is in the clamped position, the position of the clamp block 330 with respect to the support nest 310 in the longitudinal direction and the lateral direction is fixed.

The clamp block 330 includes a body 336 that may define one or more vacuum passages 334 within the body 336. A low vacuum may be applied to the one or more vacuum passages 334, and may act to draw the vehicle component 10 against the body 336 of the clamp block 330. The low vacuum may be applied to the one or more vacuum passages 334 by an air pump or the like.

The body 336 further includes a datum feature 332 that extends outward from the body 336. The datum feature 332 includes a shape that is complementary with an inseam 12 of the vehicle component 10. The datum feature 332 includes a shape that corresponds to and is opposite with the inseam 12 of the vehicle component 10. When the vehicle component 10 is drawn against the clamp block 330 by the one or more vacuum passages 334, the datum feature 332 may engage the inseam 12 of the vehicle component 10. By engaging the inseam 12 of the vehicle component 10, the clamp block 330 may position the vehicle component 10 with respect to the support nest 310 such that a stitch may be applied proximate to the inseam 12. When the robot sewing apparatus 200 (FIG. 1) is used to apply a decorative stitch to the vehicle component 10, precise positioning of the vehicle component 10 with respect to the support nest 310, and accordingly, to the robot sewing apparatus 200 (FIG. 1) may assist in accurately placing the stitch as desired on the vehicle component 10.

In particular, in some embodiments, it is desirable to place a decorative stitch on the vehicle component 10 proximate to the inseam 12, which may be positioned on an upper surface 14 of the vehicle component 10. To place a decorative stitch proximate to the inseam 12, it is desirable to position the inseam 12 of the vehicle component 10 such that the inseam 12 hangs over the support nest 310, allowing the sewing apparatus 100 to access the inseam 12. In particular, if the inseam 12 were positioned over the support nest 310 in the longitudinal direction, the sewing apparatus 100 may not be able to access the inseam 12 without contacting the support nest 310. By positioning the vehicle component 10 with respect to the support nest 310 using the clamp blocks 330, the inseam 12 of the vehicle component 10 may be positioned with respect to the support nest 310 without directly contacting or being positioned over the support nest 310, thereby allowing the sewing apparatus 100 to access the inseam 12 and apply a decorative stitch.

Operation of the sewing apparatus 100 and a method of stitching a vehicle component 10 will now be described with specific reference to the figures.

Referring to FIGS. 10 and 11, the vehicle component 10 is first positioned on the support deck 300. The one or more clamps 320 are lowered into the clamped position, as shown in FIG. 11. The vacuum passages 334 of the clamp blocks 330 may apply a low vacuum to the vehicle component 10, drawing the vehicle component 10 against each of the clamp blocks 330. When the vehicle component 10 is drawn against the clamp blocks 330, the datum features 332 of each of the clamp blocks 330 may engage the inseam 12 of the vehicle component 10.

With the vehicle component 10 drawn against the clamp blocks 330 and the inseam 12 of the vehicle component 10 engaged with the datum features 332 of each of the clamp blocks 330, the clamps 320 position the vehicle component 10 on the support nest 310 and may press the vehicle component 10 against the support nest 310. The clamp blocks 330 position the vehicle component 10 on the support nest 310 such that at least a portion of the vehicle component 10 hangs over the support nest 310 in the longitudinal direction. In particular, the clamps 320 position the vehicle component 10 such that the inseam 12 of the vehicle component 10 hangs over the support nest 310 in the longitudinal direction.

Once the vehicle component 10 is positioned on the support nest 310, the low vacuum applied to the vehicle component 10 by the vacuum passages 334 may be released. In some embodiments, a low vacuum may be applied to the vehicle component 10 by the vacuum passages 338 of the support nest 310 to retain the position of the vehicle component 10 on the support nest 310. The clamps 320 may then be moved from the clamped position, as shown in FIG. 11, to an unclamped position, such that the clamp blocks 330 are spaced apart from the inseam 12 of the vehicle component 10. Moving the clamps 320 into the unclamped position may allow the sewing apparatus 100 (FIG. 1) to access the inseam 12 of the vehicle component 10 without contacting the clamp block 330 of the clamps 320.

Referring to FIG. 9A, the sewing apparatus 100 is positioned over the vehicle component 10 to form a stitch in the vehicle component 10. The needle assembly 140 moves downward in the vertical direction, such that the needle 144 of the needle assembly 140 is inserted into the vehicle component 10. In particular, as described above, the cam member 130 rotates about the cam axis 20, and through the cam link 146 (FIG. 4) that is pivotally coupled to the cam member 130 and the needle assembly 140, the cam member 130 moves the needle assembly 140 downward in the vertical direction.

The needle 144 may be inserted within the hook assembly 160, and thread carried by the needle 144 may engage with thread carried by the hook assembly 160 to form a stitch on the vehicle component 10. As the needle 144 is inserted into the vehicle component 10, the sewing apparatus 100 moves in the stitch direction 40 with respect to the vehicle component 10 to position the sewing apparatus 100 to make a subsequent stitch. In some embodiments, the sewing apparatus 100 may be coupled to the robot arm 204 (FIG. 1.), and the robot arm 204 may move the sewing apparatus 100 in the stitch direction 40.

In the embodiment depicted in FIG. 9A, the arm 150, the needle assembly 140, and the foot 172 are positioned in the first position. In the first position, the needle assembly 140 may be generally oriented in the vertical direction, which is transverse to the stitch direction 40. As the sewing apparatus 100 moves in the stitch direction 40, the arm 150, and accordingly the needle assembly 140 and the foot 172, move from the first position, as depicted in FIG. 9A, to the second position, as shown in FIG. 9B.

Referring to FIG. 9B, the needle assembly 140 is repositioned into the second position, in which the needle assembly 140 extends at least partially in the stitch direction 40. In the embodiment shown in FIG. 9B, the needle assembly 140 extends both in the stitch direction 40 and the vertical direction. As the sewing apparatus 100 moves in the stitch direction 40, the arm 50, and accordingly the needle assembly 140 and the foot 172, pivot about the arm pivot axis 22. As described above, the arm 150, the needle assembly 140, and the foot 172 may pivot about the arm pivot axis 22 as a result of engagement between the arm 50 and the rear lobe 138. As the arm 150 pivots about the arm pivot axis 22, the needle assembly 140 and the foot 172 move in the lateral direction, and in particular, the needle assembly 140 and the foot 172 move in a direction that is opposite of the stitch direction 40. In some embodiments, the eccentric crank 180 (FIG. 2) may move the hook assembly 160 in the lateral direction, such that the hook assembly 160 and the needle assembly 140 both move in a direction opposite of the stitch direction 40. By moving the needle assembly 140 in a direction opposite of the stitch direction 40, shear stress on the needle 144 may be reduced.

In particular, when the sewing apparatus 100 moves in the stitch direction 40, the needle assembly 140 moves in the stitch direction 40 with the sewing apparatus 100. When the needle 144 of the needle assembly 140 is inserted within the vehicle component 10, movement of the needle 144 in the stitch direction 40 with respect to the vehicle component 10 may introduce shear stress into the needle 144 and/or the needle shaft 142. By pivoting the needle 144 about the arm pivot axis 22 and moving the needle 144 in a direction opposite the stitch direction 40, relative movement between the needle 144 and the vehicle component 10 in the stitch direction 40 may be reduced as the sewing apparatus 100 moves in the stitch direction 40. In this way, shear stress in the needle 144 as a result of movement of the sewing apparatus 100 in the stitch direction 40 may be reduced.

Once the needle 144 and the hook assembly 160 have formed a stitch on the vehicle component 10, the needle assembly 140 moves upward in the vertical direction, and withdraws the needle 144 from the hook assembly 160 and the vehicle component 10. In particular, as described above, the cam member 130 rotates about the cam axis 20, and through the cam link 146 (FIG. 4) that is pivotally coupled to the cam member 130 and the needle assembly 140, the cam member 130 moves the needle assembly 140 upward in the vertical direction to withdraw the needle 144 from the vehicle component 10.

Referring to FIG. 6A, concurrent with or subsequent to withdrawing the needle 144 (FIG. 9A) from the vehicle component 10, the foot 172 may move upward and disengage from the vehicle component 10. As described above, through engagement with the front lobe 132, the follower member 170 may move the foot 172 upward in the vertical direction, moving the foot 172 into a raised position, as shown in FIG. 6A.

Referring to FIG. 6B, as the sewing apparatus 100 (FIG. 2) continues to move in the stitch direction 40, the cam member 130 rotates about the cam axis 20 and the follower member 170 disengages from the front lobe 132. As the follower member 170 disengages from the front lobe 132, as described above, the foot 172 moves downward in the vertical direction, moving the foot 172 into the lowered position, in which the foot 172 engages the vehicle component 10.

Referring again to FIG. 9A, as the sewing apparatus 100 continues to move in the stitch direction 40, the arm 150 disengages from the rear lobe 138, repositioning the arm 150, the foot 172, and the needle assembly 140 into the first position. In the first position, the needle assembly 140 moves downward in the vertical direction so that the needle 144 penetrates the vehicle component 10, and the process may be repeated to form another stitch.

It should now be understood that sewing apparatuses according to the present disclosure include a needle assembly that is pivotally coupled to a housing of the sewing apparatus. As the sewing apparatus moves in a stitch direction, such as when the sewing apparatus is coupled to a robot arm that moves the sewing apparatus in the stitch direction, the needle assembly may pivot with respect to the housing of the sewing apparatus, moving the needle assembly in a direction that is opposite of the stitch direction. By moving the needle assembly in a direction that is opposite of the stitch direction, shear stress on the needle assembly, such as may result from movement of the needle assembly in the stitch direction with respect to the article being sewn, may be reduced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sewing apparatus comprising:
   a housing;
   an arm shaft that extends through the housing in a longitudinal direction;
   a cam member coupled to the arm shaft, the cam member comprising a front face and a rear face positioned opposite the front face, wherein the cam member comprises a lobe positioned on one of the front face and the rear face;
   a needle assembly coupled to the housing, the needle assembly comprising a needle shaft and a needle coupled to the needle shaft; and
   an arm pivotally coupled to the housing at an arm pivot axis that extends in the longitudinal direction and engaged with the cam member, wherein:
      the needle assembly is slidably engaged with the arm in a vertical direction and the needle assembly is constrained with respect to the arm in the longitudinal direction and a lateral direction that is transverse to the longitudinal direction;
      the arm and the needle assembly pivot about the arm pivot axis; and
      the arm is repositionable between a first position, in which the arm and the needle assembly are oriented such that the needle assembly extends in a direction that is transverse to a stitch direction, and a second position, in which the needle assembly extends at least partially in the stitch direction.

2. The sewing apparatus of claim 1, further comprising a linking member coupled to the arm and engaged with the cam member, wherein the arm is engaged with the cam member through the linking member.

3. The sewing apparatus of claim 1, wherein the arm is positioned in the second position when the lobe engages the arm, and the arm is positioned in the first position when the lobe is disengaged from the arm.

4. The sewing apparatus of claim 3, wherein the lobe is a rear lobe positioned on the rear face of the cam member, and when the rear lobe engages the arm, the arm is positioned in the second position.

5. The sewing apparatus of claim 1, further comprising a foot coupled to the arm, wherein the foot is slidably engaged with the arm in the vertical direction and the foot is constrained with respect to the arm in the longitudinal direction and the lateral direction.

6. The sewing apparatus of claim 5, wherein the lobe is a front lobe positioned on the front face of the cam member.

7. The sewing apparatus of claim 6, wherein the foot is repositionable between a raised position, in which the foot is engaged with the front lobe, and a lowered position, in which the foot is disengaged from the front lobe, wherein the raised position and the lowered position are spaced apart from one another in the vertical direction.

8. The sewing apparatus of claim 1, wherein the needle assembly is pivotally coupled to the cam member.

9. A robot sewing apparatus comprising:
   a base;
   a robot arm coupled to the base;
   a sewing apparatus coupled to the robot arm, the sewing apparatus comprising:
      a housing;
      an arm shaft that extends through the housing in a longitudinal direction;
      a cam member coupled to the arm shaft, the cam member comprising a front face and a rear face positioned opposite the front face, wherein the cam member comprises a lobe positioned on one of the front face and the rear face;
      a needle assembly coupled to the housing, the needle assembly comprising a needle shaft and a needle coupled to the needle shaft; and
      an arm pivotally coupled to the housing at an arm pivot axis that extends in the longitudinal direction and engaged with the cam member, wherein:
         the needle assembly is constrained with respect to the arm in a stitch direction and the needle assembly is slidably engaged with the arm in a vertical direction;
         the arm and the needle assembly pivot about the arm pivot axis; and
         the arm is repositionable between a first position, in which the arm and the needle assembly are oriented such that the needle assembly extends in a direction that is transverse to the stitch direction, and a second position, in which the needle assembly extends at least partially in the stitch direction.

10. The robot sewing apparatus of claim 9, further comprising a linking member coupled to the arm and engaged with the cam member, wherein the arm is engaged with the cam member through the linking member.

11. The robot sewing apparatus of claim 9, wherein the arm is positioned in the second position when the lobe engages the arm, and the arm is positioned in the first position when the lobe is disengaged from the arm.

12. The robot sewing apparatus of claim 9, further comprising a foot coupled to the arm, wherein the foot is constrained with respect to the arm in the stitch direction, and the foot is slidably engaged with the arm in the vertical direction.

* * * * *